United States Patent [19]

Witt et al.

[11] 4,315,823
[45] Feb. 16, 1982

[54] ANAEROBIC TREATMENT

[75] Inventors: Enrique R. Witt; William J. Humphrey; James P. Cave, all of Corpus Christi, Tex.

[73] Assignee: Celanese Corporation, New York, N.Y.

[21] Appl. No.: 150,829

[22] Filed: May 19, 1980

Related U.S. Application Data

[63] Continuation of Ser. No. 57,545, Jul. 13, 1979, abandoned, which is a continuation of Ser. No. 737,241, Oct. 29, 1976, abandoned.

[51] Int. Cl.³ .............................. C02F 3/28; C02F 3/30
[52] U.S. Cl. ................................... 210/605; 48/197 A; 210/607; 210/615; 210/626; 210/631
[58] Field of Search ............... 210/601, 603, 605, 607, 210/617, 618, 621, 622, 623, 630, 631, 150, 151, 615; 48/197 A

[56] References Cited

U.S. PATENT DOCUMENTS

| | | | |
|---|---|---|---|
| 1,194,933 | 8/1916 | Barber | 210/610 |
| 3,575,853 | 4/1971 | Gaughan et al. | 210/667 |
| 3,846,289 | 11/1974 | Jeris et al. | 210/610 |
| 4,134,830 | 1/1979 | Skogman et al. | 210/603 |
| 4,182,675 | 1/1980 | Jeris | 210/603 |

FOREIGN PATENT DOCUMENTS 2338853 2/1974 Fed. Rep. of Germany ...... 210/903

OTHER PUBLICATIONS

Young et al., "The Anaerobic Filter for Waste Treatment", *WPCFJ*, pp. R160-173, May 1969.
Climenhage, "Biological Denitrification of Nylon Intermediates Wastewater", 22nd Canadian CHE Conference, Sep. 1972.
*Merck Index*, 6th Edition, p. 879, 1952.
Jennett et al., "Anaerobic Filter Treatment of Pharmaceutical Waste", *JWPCF*, pp. 104-121, Jan. 1975.

*Primary Examiner*—Peter A. Hruskoci
*Attorney, Agent, or Firm*—Abner Sheffer

[57] ABSTRACT

Treatment of waste streams, particularly acidic petrochemical wastes, in anaerobic filter at high loadings with high rates of recycle. The effluent from the top of the filter is passed into a gas-disengaging-solids-settling zone containing a quiescent body of the liquid of said effluent. Particles of solid biomass settle in that liquid body and are withdrawn, with the liquid, and recycled to the base of said filter together with fresh acidic waste and added inorganic alkaline material. The outfall from the settling zone is fed to an aerobic digester and the resulting activated sludge is recycled to the filter. The alkaline material is preferably magnesium oxide or carbonate. Sodium formate may also be used as the alkaline material.

17 Claims, 1 Drawing Figure

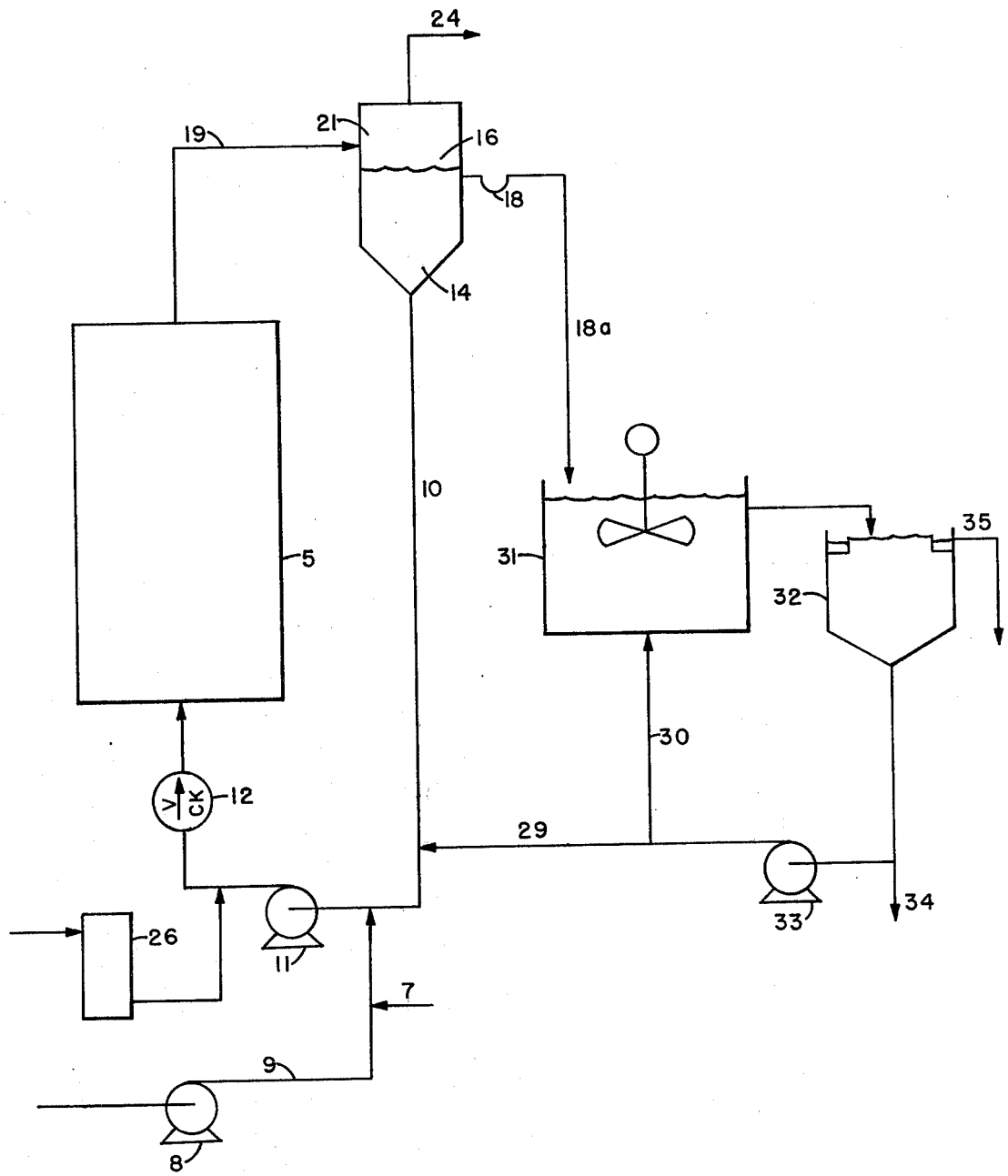

ANAEROBIC TREATMENT

This is a continuation of application Ser. No. 57,545, filed July 13, 1979, now abandoned, which is a continuation of application Ser. No. 737,241 filed Oct. 29, 1976, now abandoned.

Anaerobic filters for treatment of aqueous waste streams and production of methane gas are well known in the art. See for instance, the articles by Young and McCarty, J. Water Poll. Control Fed. 41 (5), 1969 pages 160-173; Taylor and Burns, Water-1972 Symposium Series American Institute of Chemical Engineers, pages 30-37; Lovan and Foree, The Brewers Digest, Feb. 1972, pages 66-73; Jennett and Dennis J., Water Poll. Control Fed. 47 (1), Jan. 1975, pages 104-121; Hovius, Conway and Harvey "Pilot Studies of Biological Alternatives For Petrochemical Waste Treatment" paper given at 26th Purdue Industrial Waste Conference May 4-6, 1971; El-Shafie and Bloodgood J., Water Poll. Control Fed. 45 (11) 1973, pages 2345-2357; Clark and Speece "The pH Tolerance of Anaerobic Digestion" paper given at 5th International Water Pollution Research Conference July-August 1970.

In accordance with one aspect of the invention there is provided an improved and highly effective process for anaerobic filtration of aqueous waste streams containing organic carboxylic acids. The effluent from the top of the filter is passed into a gas-disengaging-solids-settling zone containing a quiescent body of the liquid of said effluent. Particles of solid biomass settle in that liquid body and are withdrawn, with the liquid, and recycled to the base of said filter together with fresh acidic waste and added inorganic alkaline material (such as NaOH). The amount of alkaline material added is such as to maintain an approximately neutral pH in the effluent from the top of the filter. This effluent contains bicarbonate which acts as a buffer when recycled, thus greatly decreasing the amount of added alkaline material needed for such pH control.

In one preferred form of the invention the added inorganic alkaline material is a magnesium compound such as MgO or $MgCO_3$. This may be added to the acidic feed where it becomes converted to the magnesium salt of the carboxylic acid therein (e.g. to magnesium formate or acetate). In the bottom of the filter (or in the recycle stream) these salts are largely converted to a magnesium carbonate compound which may be bicarbonate. It is found that at the relatively high partial pressure of $CO_2$ generally prevailing in the filter and in the recycle line (e.g. a $CO_2$ partial pressure of about 1/5 to $\frac{1}{3}$ or $\frac{1}{2}$ atmosphere when the system is operated at substantially atmospheric pressure) the magnesium does not precipitate out; this is in contrast with the behavior of the corresponding calcium compounds, which tend to precipitate in the filter thus significantly diminishing the void space in the filter.

In another preferred aspect of the invention, the added inorganic alkaline material is replaced wholly, or in part, by a lower fatty acid salt of sodium, such as sodium formate (or sodium acetate). It is found that in the recycle system such organic salt gives the desired effect of maintaining the substantially neutral pH in the effluent from the top of the filter, e.g. the formate is converted to the bicarbonate in the filter and the bicarbonate present in the recycle stream acts to neutralize a large part of the acidity of the fresh waste feed. While the use of a lower fatty acid salt such as sodium formate instead of NaOH does raise the C.O.D. (chemical oxygen demand) load on the filter, this increase is not substantial because the amount of fresh sodium formate (or similar salt) required is relatively low. For instance, for a stream containing carboxylic acids and having a C.O.D. content of about 12,000 mg/l, the percent increase in C.O.D. load owing to the use of sodium formate in place of NaOH is less than 10%.

It will be understood that one may also employ a mixture of magnesium compounds and NaOH and/or sodium formate instead of using these materials individually. Also, in the starting up of the process before the anaerobic biomass has become established in the filter it is generally best to use a feed at neutral pH (e.g. pH $7\pm0.5$) and to provide the needed alkalinity largely or entirely by such compounds as NaOH or MgO.

The effluent from the top of the anaerobic filter has a considerably lower C.O.D. than the fresh feed. Of course, not all this effluent is recycled to the base of the anaerobic filter. A portion of the effluent is drawn off from the upper portion of the quiescent body of liquid in the settling zone. In this withdrawn portion (hereafter termed the "outfall"), the biomass concentration is considerably lower than that in the recycled portion. The outfall is, in one preferred form, fed to an aerobic digestor for removal of a substantial percentage of its remaining content of dissolved biodegradable material or for the oxidation of foul-smelling components such as $H_2S$. In the aerobic digestion this dissolved biodegradable material is used to support the growth of bacteria, so that it is converted into the solid form (comprising a mass of bacteria) known as "activated sludge".

In one preferred form of the invention a significant portion of this activated sludge is recycled to the anaerobic filter. It is found that the activated sludge is at least partially converted to methane gas in the anaerobic filter. This reduces the amount of solids formed in the overall process.

When the alkaline agent added to the feed to the anaerobic filter is a magnesium compound, the material passing from the settling vessel through the aerobic digestor loses carbon dioxide to the atmosphere (e.g. to the air or oxygen used for aeration). In tests thus far it is found that the magnesium remains, nevertheless, largely in solution. When the activated sludge (having a large aqueous content) is fed to the anaerobic filter, its entrained magnesium content decreases the amount of fresh alkaline magnesium compound required for control of the pH in the anaerobic stage.

In one preferred practice of the invention the fresh feed has a C.O.D. of above 2000, usually above 5000 or 6000 mg/l. The process is particularly suitable for fresh feeds having C.O.D. values above 10,000, such as 20,000 to 40,000 mg/l or even 50,000 mg/l or more. The fresh feed usually contains at least about 98% $H_2O$. The total blend of fresh feed and recycled material entering the base of the anaerobic filter generally has a C.O.D. in the range of about 500 to 20,000, preferably about 1000 or more.

The packing in the filter is preferably such as to provide a void volume (volume of empty unpacked filter minus volume actually occupied by the solid of the packing) well above 60%, more preferably above 75% such as 85 to 95% or more of the volume of the unpacked filter. This can be accomplished with thin-walled plastic rings or cylinders, such as the packing known as Pall rings which are described in Chemical Engineering Progress 54 (1), 1958, pages 70-75. The ring diameters may be, for instance, in the range of about ⅜" to 4", and are preferably at least about 2 inches for use in a large scale anaerobic filter. Other types of packings providing high void volumes and preferably high surface areas (e.g. surface areas of well over 10 sq. ft. per cubic foot, preferably above 20, such as about 30 sq. ft. per cu. ft. or more) may be used, such as apertured plastic saddles, or cylindrical brushes comprising tufts of plastic bristles symmetrically arranged around a stainless steel wire core. The loading on the anaerobic filter in our process is generally above 0.2 (and preferably at least about 0.5) lb. C.O.D. per cubic foot of void volume of the filter per day, e.g. a loading of 1 or even 2 lb. C.O.D. per cu. ft. per day. The calculated hydraulic feed rates (volume of total fresh feed and recycled material per hour divided by void volume of filter) are generally at least about 1 foot per hour, such as 1.5, 2,3,5, or 6 feet per hour or higher, but usually below about 10 feet per hour.

The recycle ratio, i.e. the ratio of the volume of the recycled liquid to the volume of fresh feed, is at least about 1:1 and preferably at least about 2:1, such as about 4:1, 5:1 or 10:1. While higher ratios such as about 20:1 or 40:1 may be employed, it is preferred in most commercial operations to keep the ratio below 15:1 such as about 10:1 or less. For very high strength petrochemical wastes, e.g. having about 50,000 mg/l C.O.D., ratios above about 10:1 may be best.

In the operation of the anaerobic filters it has been found that the amount of biomass adhering to the packing, even after extended operation, is such as to occupy only a small fraction of the void volume of the filter, e.g. some 20% or less of the void volume (this being measured by allowing the contents of the filter to drain out and measuring the volume of the liquid thus removed), even though there is a significant recycle of biomass to the filter. While the reasons for this are not clearly understood, it is believed that the recycled bacteria serve, in part, as food for the bacteria in the filter. It is also found, on inspection of filters after lengthy (e.g. 6 months or more) operation under recycle that the biomass attached to the filter packing is distributed on the packing substantially throughout the filter; visually this distribution appears to be substantially uniform from top to bottom. The biomass is gelatinous or slimy and can be stripped off the packing (e.g. the pall rings) to a large extent by means of a gentle stream of water or even by simply dropping the ring into a bucket of water (but when the biomass-covered rings are gently placed into a body of water, the covered layer of biomass does remain on the rings).

The content of biomass in the outfall of the anaerobic filter (operated with recycle of effluent and of settled particles of biomass therein) is quite low, such as less than 600, e.g. about 100 to 500 such as about 300 mg VSS (volatile suspended solids) per liter.

The anaerobic filter should be supplied with nitrogen and phosphorus (e.g. in a ratio of about 5 mgN per mgP). While proportions such as 5 mgN, or more per 100 mg C.O.D. in the feed (and correspondingly 1 mgP, or more) may be employed, it is found that excellent results, with small discharge of biomass into the outfall, are obtained when still smaller amounts are employed, such as 2.5 mgN and 0.5 mgP per 1000 mg C.O.D. Thus a preferred range is about 2 to 3 mgN and 0.30 to 0.7 mgP per 1000 mg C.O.D. (for carbohydrate-type wastes larger proportions such as up to 5 mgN and 1 mgP may be desirable). The N may be supplied in the form of, for instance, urea, $NH_3$ or an ammonium salt, such as the sulfate; and the P may be supplied in the form of $H_3PO_4$ or as ammonium phosphate, for instance. It is also desirable to supply cobalt (e.g. as cobaltous) such as in amounts of 0.1 mg, or more, $Co++$/liter. Another essential trace element is iron, but that exists normally in sufficient amounts in almost every waste water to be treated. In cases where say some 10% or more of the feed C.O.D. is present in the outfall of the anaerobic reactor, it is desirable to include increased quantities of nutrients (N and P) to promote the aerobic growth (which uses some 10 times the nutrients required for anaerobic growth per unit of C.O.D.). While this extra N and P may be added to the anaerobic outfall (i.e. the feed to the aerobic digester), it is preferably added to the feed to the anaerobic filter, as through line 7 in the drawing.

The anaerobic filters attain very high degrees of removal of C.O.D. such as above 80% removal (often removing about 90 to 95% or more) even at high C.O.D. loadings. As a result only a small portion of the original C.O.D. is supplied to the aerobic digester. When the original C.O.D. comprises an alcohol-aldehyde-carboxylic acid mixture the outfall of the anaerobic filter has a much greater proportion of carboxylates and a smaller proportion of alcohol and aldehyde than the feed to the filter.

As indicated above, it is generally desirable to provide sufficient alkaline material to maintain the pH of the effluent of the anaerobic filter in the approximately neutral range, preferably pH about 6 to 8.5 and more preferably about 6.8 or 7.0 to 8.0. The pH of that effluent is preferably measured by intermittently contacting a pH sensor (such as a glass electrode of a conventional pH meter) with the effluent and cleaning the liquid-contacting surface of the sensor intermittently to avoid the undesirable build-up of biomass which would interfere with the sensitivity of the sensor to the actual effluent pH. The pH may be measured on the liquid outfall from the settling vessel, prior to any significant loss of $CO_2$ from said liquid outfall.

The proportion of fresh alkaline material added with the fresh feed to the filter (after the start-up period) is often in the range of about 25 to 50% of that needed to neutralize the acidity present in the fresh feed and generated by pre-methanogenic reactions (i.e. formation of lower fatty acids). When the alkaline material is a sodium compound the proportion of $Na+$ in the total feed to the anaerobic filter is usually not above about 4 g/l, (not above about 0.2 gram equivalent per liter), commonly about 1 g/l (about 0.04 gram equivalent per liter). Similar equivalent proportions may be used for magnesium.

The aqueous waste streams which may be treated in accordance with this invention include those from petrochemical plants, which may contain, for example, acids (e.g. such carboxylic acids as formic, acetic, propionic, acrylic, glycollic, maleic, adipic, benzoic, butyric, valaric, hydracrylic, glyceric, succinic, fumaric, glutaric, phthalic, isophthalic, terephthalic); alcohols (e.g. methanol, ethanol, n-propanol, ethylene glycol, polyethylene glycol, 1-butanol, 2-butanol, iso-butanol, propylene glycol, 1,3-butyleneglycol, 1,5-pentanediol, 1,6-hexanediol, glycerol); ketones (e.g. acetone, methyl ethyl ketone, cyclohexanone); esters (e.g. such carboxylic esters as ethyl acrylate, methyl propionate, methyl hydrogen adipate, methyl methacrylate); aldehydes (e.g. formaldehyde, acetaldehyde, acrolein, methacrolein, glyceraldehyde, benzaldehyde); phenols (e.g. phenol or cresol). The materials may be aliphatic, cycloaliphatic or aromatic, and ethylenically saturated or unsaturated. It is found that compounds which are considered to be highly biocidal such as formaldehyde, phenol and aerolein and cyanide ion can be removed even when present at relatively high levels in the feed stream. For instance the feed stream may contain over 1000 mg/l. of formaldehyde (such as 0.1 to 1%) or 2000 mg/l of phenol. In general theingredients of the petrochemical waste stream will have less than 9 carbon atoms, preferably below 7 carbon atoms; often they will be largely organic compounds having 1 to 4, or even 1 to 2, carbon atoms. Certain components, even in relatively small amounts, will be generally incompatible with the operation of the anaerobic filter and their presence in interfering amounts should therefore be avoided; these include the chlorinated methanols, e.g. methylene chloride, chloroform, carbon tetrachloride and precursors thereof such as chloral, and certain amines such as hexamethylenediamine. Certain other compounds are not incompatible with the operation of the anaerobic filter but pass through it largely unaffected; among these are highly branched compounds such as pentaerythritol, neopentyl glycol, trimethylolpropane and t-butanol (e.g. compounds in which there are tertiary carbons to which most of the carbons are directly attached) and non-hydrolyzable polymers such as polyacrylic acid. These compatible non-degrading components may be present in the waste streams treated in accordance with this invention; their presence increases the measured C.O.D. level but does not represent an actual load on the anaerobic filter and the C.O.D. loads given herein have been corrected, when necessary, to exclude the contribution to C.O.D. of such non-anaerobically degradable materials, when present.

The feed streams may contain otherwise toxic heavy metals, such as copper, nickel, chromium, zinc, mercury or nickel. In that case it is desirable to provide a sufficient amount of sulfur to the feed (e.g. in the form of soluble sulfide or sulfate such as sodium sulfate) to combine with the heavy metal and precipitate it as the insoluble sulfide. See Lawrence and McCarty "The Role of Sulfide in Preventing Heavy Metal Toxicity in Anaerobic Treatment" J. Water Pollution Control Federation 37 (1965 p. 392–406). Chromium, which does not form an insoluble sulfide, is probably immobilized as a basic oxide.

While the features of the invention have thus far been tested mainly for acidic waste streams (generally having a pH below about 5, such as 3 to 4), it is within the broader scope of the invention to use it with neutral or alkaline streams, in which case acid moiety is generated anaerobically within the filter, e.g. by hydrolysis of carbohydrates.

As mentioned above, the outfall from the aerobic digester is, in part, recirculated to the anaerobic filter. Thus the proportion recirculated may be about 20 or 40% (but is preferably a major portion such as about 60 or 80% or more) of the net activated sludge produced in the aerobic digestor. The feed to the aerobic digestor may comprise the outfall from the anaerobic filter alone, or may also include other streams as waste streams of low C.O.D. content, such as 500 mg/l C.O.D. or less, which may be sent directly to the aerobic digestor.

The feeding and recycling to the anaerobic filter are preferably both effected in continuous fashion. It will be understood that the waste used as the fresh feed to this filter may vary considerably in strength and composition during the process and that when, for instance, the waste strength (or the proportion of incompatible components therein) increases to a level at which the filter operation is adversely affected, the rate of feed of the waste may be decreased, or feed may be discontinued temporarily, and the recycle ratio may be increased. Also, the fresh feed may be supplied continually but intermittently, with continuous recycle (e.g. the waste may be fed for 10 seconds every minute while total feed to the base of the filter (i.e. recycle plus any fresh feed) is supplied at a uniform rate during the operation, with the recycle ratio being calculated on the basis of total volume of recycle divided by total volume of fresh feed during the process); or the recirculation and feed may be suspended for a period of time (e.g. over a weekend), leaving the filter and recycle line filled, and then resumed.

While the anaerobic filter may be of relatively small size (e.g. a volume of 22 liters, 4 feet high and 6 inches in diameter for a laboratory unit) commercial size units should have volumes of at least about 1000 liters (such as a thousand, a hundred thousand or a million liters or more) with heights of about 8 to 60 feet (e.g. 20 to 30 feet).

The gas-disengaging-solids-settling zone preferably has a gas space in its upper portion and a liquid space in its lower portion and is constructed so that the effluent (from the top of the anaerobic filter) is fed into the gas space at a point above the level of the body of liquid. To aid in disengaging gas bubbles present in the entering effluent the latter may enter the gas space through an inlet (or inlets) which forms it into a relatively thin film (e.g. a stream having a thickness of less than about $\frac{1}{8}$ inch). For instance one may use a tube feeding upwardly to an inlet above the liquid level so that a stream or film of the entering mixture flows downward on the outside of that tube before it enters the body of liquid in the settling zone. Alternatively, one may use a thin tube which feeds horizontally (or a wider tube terminating in a thin opening or nozzle), or the inlet tube may be arranged to enter the disengaging-settling zone tangentially to a concave arcuate wall of that zone so as to form a thin flattened stream, on that wall, in which the centrifugal effect forces the denser components (liquid and solid) outward against the wall so as to promote separation from the less dense component (gas). The separation of gas may also be promoted by providing baffles against which the incoming mixture impinges (again forming the mixture into thin streams) and/or by providing weirs over which the incoming mixture flows. The residence time in the settling zone may vary. Preferably it is at least about 5 minutes, e.g. about 7 or 15 or 20 or 60 minutes. Time should not be too long, since the bacteria in the settled solids tend to continue to generate gas (e.g. methane) during their residence in the settling zone and such bubbles adhere to the settled bacterial particulate agglomerates and tend to lift them from the bottom of that zone. The upper limit of residence time will thus depend on such factors as the biodegradable C.O.D. in the effluent and the degree to which gas bubbles are removed from the bacterial particles prior to settling. In general it is below 2 hours. Typically, the degree of settling is such that the VSS ("volatile suspended solids") concentration in the outfall is less than 80% of the VSS concentration in the recycled material (e.g. VSS levels of 1175 mg/l [recycle] with 360 mg/l [outfall], or 355 mg/l [recycle] with 235 mg/l [outfall] and the VSS concentration in the outfall is below about 500 mg/l.

The following examples are given to illustrate this invention further. In this application, unless otherwise noted, proportions are by weight and temperatures are Centigrade.

EXAMPLE 1

The anaerobic filter 5 used in this Example is a circular cylindrical corrosion-resistant tank 10 feet high and 6 feet in diameter filled with randomly arranged plastic rings (Norton "Actifil" plastic biorings 2 inches in diameter, two inches high) such packing providing a surface area of 39 sq. ft/cu ft and a void space of 92%. The acidic waste supplied to the filter is fed by pump 8 through pipe 9 into a recycle loop 10 where it is mixed with recycled liquid (and solid) effluent from the filter. The contents of loop 10 are pumped continuously into the bottom of the filter 5 by a pump 11 operating at a constant rate and enter the bottom of the filter through a check valve 12 (which would serve to prevent drainage of the contents of the filter 5 in the event of a rupture in loop 10). Liquid and gas emerge from the top of the filter 5 into a disengagement vessel 13 in which there is a body of substantially quiescent liquid 14 whose surface 16 is maintained at a substantially constant level by the presence of an overflow seal 18 of the inverted syphon type in an outfall line 18a.

The liquid gas mixture from the filter flows upward through a tube 19 whose outlet 21 is above the surface 16 such as 8 inches above it). This liquid gas mixture contains also solid biomass material in finely dispersed suspended condition and larger particles of solid biomass material which particles may be loosely attached to bubbles of the gas. On spilling out from the narrow tube 19 (a circular tube 1 inch in diameter) such gas bubbles tend to be released from these larger particles (which are flocculent rounded or spheroidal about 1 to 5 mm in diameter). The latter then settle in the liquid body 14 and are drawn off with the liquid from the bottom of the vessel 13 and returned to the filter 5 through the recycle loop 10. The non-recycled effluent which leaves through seal 18 is slightly cloudy because it contains finely dispersed biomass material, (e.g. in the range of 200–300 mg VSS/l). The vessel 13 is of such size that the average residence time therein (i.e. rate of flow of liquid, and solid, from tube 19 divided by volume of liquid body 15) is well below ½ hour, e.g. 15 minutes. It is found that when long residence times are used there is a tendency for the settled biomass particles to generate sufficient gas to refloat many of them so that they are lost in the non-recycled effluent. The gas leaves through a pipe 24 at the top of vessel 13.

In one suitable construction, the vessel 13 is 6 feet high and of circular cross-section, its upper ⅔ being cylindrical and its lower ⅓ being of inverted conical shape. The level of surface 16 is about 2 feet below the top of the vessel 13 and about on the same level as the top of the filter 5. The void space above the surface 16 is at atmospheric pressure or slightly above.

The acidic waste used in this Example is waste water from a petrochemical plant. Its average chemical oxygen demand is about 25,000 mg. C.O.D. per liter and it typically contains formic acid (in amounts varying from, say, about 0.4 to 0.5%), acetic acid (e.g. in amounts of about 1 to 1.5%), formaldehyde (e.g. in amounts of about 0.15 to 0.7%), methanol (e.g. in amounts of 0.01 to 0.55%). Substantially no non-degradable C.O.D. is present. Before feeding such waste to the anaerobic filter, the filter is started up by charging it with activated sludge from a sludge anaerobic digestor of a sewage plant and then feeding a synthetic startup blend of 15 g C.O.D. per liter (containing 5 g C.O.D./l of each of acetic acid, formic acid and methanol, plus urea and $H_3PO_4$) to the recycle loop while maintaining a volumetric ratio of recycled liquid to feed of 5:1 while blending the feed with NaOH (which maintains the pH of the outfall, from line 18a, at about 7). This is continued for about 2 to 3 weeks (as described more fully below) until the filter is producing methane in satisfactory fashion. The feed synthetic blend is then replaced partly, stepwise, at intervals of about 3 days each, by the petrochemical waste until, after a period of about 3 weeks, the feed is 100% petrochemical waste (e.g. first 5%, then 10%, then 20%, then 35%, then 50%, then 70% and finally 100%). During this period the previously mentioned nutrient feed and NaOH feeds are also maintained. Throughout this initial period the recycle pump operates at a speed such that the detention time in the filter is about 5 days. Then, over a one month period the pumping rate is increased (and the fresh feed rate is also increased, to keep the recycle ratio at 5:1) until this detention time is 2 days, at which time the feed rate is such as to supply about ½ lb C.O.D. per cubic foot of filter (calculated on the void space) per day, the average hydraulic velocity being about one foot per hour.

Throughout the process fresh biological material, e.g. samples of earth or of activated sludge from an anaerobic or aerobic digestor, are supplied once a week to the recycle line, through a blowcase arrangement 26. The contents of the filter, the recycle loop and the disengagement vessel are maintained at a temperature of about 37° C. by supplying sufficient heat (or cooling when needed) through a heat exchanger around the fresh feed pipe 9.

The outfall from line 18a is fed continuously to an aerobic digestor 31 which is of conventional type, e.g. a violently stirred vessel containing activated sludge, from which a sludge slurry passes to a clarifier 32. Part of the sludge is recycled to the stirred vessel through line 30. After the aerobic digestor has been in operation for a time sufficient to produce a desirable sludge content therein (e.g. about 1 month), a portion (e.g. 70 to 80%) of the net (non-recycled) sludge slurry discharged from the clarifier (e.g. a pumpable slurry of about 1 to 5% solids content) is continuously fed as by pump 33 through line 29 to the recycle loop 10 (e.g. upstream of pump 11), or into admixture with the acidic waste stream being fed to the anaerobic filter so that its aerobic bacteria are killed by contact with that stream). Clarified outfall is finally discharged through line 35, and some net make of aerobic biomass is discharged through line 34.

In starting the anaerobic filter the startup mixture used is an aqueous solution containing 4.69 g/l acetic acid, 15.0 g/l formic acid, 3.33 g/l methanol, neutralized with 16 g NaOH/l and containing 80 mg/l urea (37.3 mgN/l), 28 mg/l of 85% $H_3PO_4$ (7.5 mg P/l) and ferrous and cobaltous acetates in amounts to provide 1 mg/l of each of $Fe^{++}$ and $Co^{++}$. This feed is supplied (at a rate to give 10 days detention time) for 4 days; then the amount of NaOH is decreased to 5 g/l and the feed rate is increased (so that the detention time is decreased to 5 days).

EXAMPLE 2

In the system described in Example 1 the sodium hydroxide is replaced by MgO. This is added to the acidic feed (i.e. the startup blend and/or petrochemical waste) in an amount which, with the $MgCO_3$ mentioned below, is sufficient to maintain the anaerobic filter outfall pH at about 7, as is the case with NaOH. The acidity of the feed converts the MgO and $MgCO_3$ into dissolved magnesium acetate and formate. In the presence of the dissolved $CO_2$ in the recycle loop 10 and in the filter 5 and settler 13 soluble magnesium compound is formed. The grade of MgO is Fisher Scientific Company MgO "heavy".

EXAMPLE 3

In the system described in Example 1, after startup the sodium hydroxide is replaced by sodium formate. This may be added to the acidic feed as an aqueous solution of, for instance, about 30% concentration. The amount of sodium formate added is sufficient to maintain the anaerobic filter outfall pH at about 7, as is the case with NaOH. (At start-up it is preferable to use NaOH initially, before the effects of the recycling become significant, to aid in providing a substantially neutral feed to the base of the anaerobic filter).

Particularly suitable and economical sources of sodium formate are aqueous waste streams obtained in the production of pentaerythritol and/or trimethylolpropane. Typical analyses of such waste streams are given below: From pentaerythritol production: about 30 to 40% sodium formate and up to about 60% other organics (mostly pentaerythritol); oven-dried (solids) content C 29%, H 3.1% Na 23.7%; while the measured C.O.D. content of this waste stream is 272 g/l, much of this C.O.D. is pentaerythritol which (as mentioned above) is substantially unaffected in the anaerobic filter, and the effective C.O.D. content is about 70 g/l. From the trimethylpropane production: about 45% sodium formate with less than 1% of other organics. The impurities in such sodium formate waste stream do not interfere with the anaerobic process. The amount of sodium formate needed is such as to effectively add a C.O.D. load of well below 15% (e.g. below 10%, such as about 8%) of the C.O.D. load contributed by the petrochemical waste fed to the filter.

Determinations of C.O.D., B.O.D., suspended solids, etc. are well known in the art; see, for instance, "Standard Methods for the Examination of Water and Wastewater Including Bottom Sediments and Sludges" 12th ed. pub. 1969 by American Public Health Association, as at pages 219, 415, 424-5.

The anaerobic and aerobic treatments may be effected at temperatures and pressures within the range generally known in the art. For the anaerobic filter that art usually employs a temperature within the range of about 30° to 50° C.; most preferably the temperature is about 35° to 40° C., such as about 37° C. Pressure is typically about atmospheric but it is within the broader scope of the invention to use lower or higher pressures.

We claim:

1. Process for the treatment of aqueous organic waste streams in an anaerobic filter, with concomitant production of methane gas while supplying alkaline material to the filter to neutralize acids fed thereto and formed therein, to produce a liquid effluent stream containing said methane gas from said filter, said liquid effluent stream having a lower C.O.D. content than said waste stream and containing less than 600 mg per liter of volatile suspended solids, said process comprising separating said methane gas from said liquid effluent stream, separating said liquid effluent stream into two liquid streams, hereafter termed stream a and stream b, withdrawing said liquid stream a while recycling said liquid stream b, to said filter and blending said stream b together with fresh feed of said waste stream, the volumetric rate of said fresh feed being about the same as the volumetric rate of withdrawal of said liquid stream a, and the ratio of said volumetric rate of feed to the volumetric rate of said recycle being in the range of about 1:1 to 1:20, feeding said withdrawn liquid a to an aerobic digestor to produce an activated sludge slurry, passing said activated sludge slurry to a clarifier to produce activated sludge and a clarified effluent and recycling at least about 20% of the net activated sludge produced in said aerobic digester to said anaerobic filter, in which process said fresh feed of said waste stream has a C.O.D. of at least about 5000 mg/l, the fresh feed is supplied at a rate which is at least about 0.5 lb. C.O.D. per cubic foot of filter per day, the mixture of said liquid b and said fresh feed has a C.O.D. of at least about 500, said filter comprises packing of such construction that the void volume is about 60%, the hydraulic feed rate in said filter is at least about 1 foot per hour and said fresh feed has a pH of about 3 to 5.

2. Process as in claim 1 wherein the $CO_2$ partial pressure in said filter being at least about 1/5 atmosphere.

3. Process as in claim 2 in which the fresh feed comprises formic acid and about 0.1 to 1% formaldehyde, and said void volume being over 75%.

4. Process as in claim 3 in which the concentration of volatile suspended solids in said liquid b is less than 80% of that in said liquid a.

5. Process as in claim 4 in which the concentration of magnesium in the total feed to the base of said filter is at most about 0.2 gram equivalent per liter.

6. Process as in claim 1 in which the fresh feed comprises formic acid and about 0.1 to 1% formaldehyde, and said void volume being over 75%.

7. Process as in claim 6 in which the concentration of volatile suspended solids in said liquid b is less than 80% of that in said liquid a.

8. Process as in claim 7 in which the concentration of sodium in the total feed to the base of said filter is at most about 0.1 gram equivalent per liter.

9. Process as in claim 1 in which said fresh feed has a C.O.D. of about 5000 to about 50,000 gm/l and said hydraulic feed rate is about 1 to about 10 feet per hour.

10. Process as in claim 1 in which said ratio of said volumetric rate of feed to said volumetric rate of recycle is about 1:4 to 1:15 and the void volume of the filter is above 75%.

11. Process as in claim 10 in which at least 60% of the net activated sludge produced in said aerobic digestor is recycled to said anaerobic filter.

12. Process as in claim 1 in which the volatile suspended solids content in said stream a is below about 500 mg/l.

13. Process as in claim 1 in which said dividing step comprises passing said liquid effluent stream into a gas-disengaging solids-settling zone to produce a liquid stream a which has a lower concentration of said suspended bacterial solids than either said effluent stream or said stream b.

14. Process as in claim 13 in which said fresh feed has a C.O.D. of about 5000 to about 50,000 mg/l and said hydraulic feed rate is about 1 to about 10 feet per hour.

15. Process as in claim 1 in which said alkaline material comprises magnesium oxide or magnesium carbonate.

16. Process as in claim 1 in which said alkaline material comprises sodium formate.

17. Process as in claim 1 in which said fresh feed of said waste stream comprises formic acid and about 0.1 to 1% formaldehyde.

* * * * *

UNITED STATES PATENT AND TRADEMARK OFFICE
CERTIFICATE OF CORRECTION

PATENT NO. : 4,315,823

DATED : February 16, 1982

INVENTOR(S) : E.R. Witt, W.J. Humphrey, J.P. Cave

It is certified that error appears in the above-identified patent and that said Letters Patent are hereby corrected as shown below:

In claim 1, at column 10, line 26 change "about" to -- above --.

In claim 9, at column 10, line 50 change "gm/l" to -- mg/l --.

In claim 4, at column 10, line 35 change "b" to -- a -- and at line 36 change "a" to -- b --.

Signed and Sealed this

Twentieth Day of July 1982

[SEAL]

Attest:

GERALD J. MOSSINGHOFF

*Attesting Officer*     *Commissioner of Patents and Trademarks*